US011914315B2

(12) United States Patent
Oguri

(10) Patent No.: US 11,914,315 B2
(45) Date of Patent: Feb. 27, 2024

(54) IMAGE FORMING APPARATUS THAT FIXES TONER IMAGE TO RECORDING MEDIUM USING FIRST AND SECOND HEATERS SUPPLIED WITH CURRENT DURING OVERLAPPING TIME PERIODS

(71) Applicant: CANON KABUSHIKI KAISHA, Tokyo (JP)

(72) Inventor: Hiroshi Oguri, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/867,878

(22) Filed: Jul. 19, 2022

(65) Prior Publication Data

US 2023/0025489 A1 Jan. 26, 2023

(30) Foreign Application Priority Data

Jul. 21, 2021 (JP) ................................ 2021-120811

(51) Int. Cl.
*G03G 15/20* (2006.01)
*H05B 1/00* (2006.01)
(Continued)

(52) U.S. Cl.
CPC ....... *G03G 15/205* (2013.01); *G03G 15/2039* (2013.01); *G03G 15/5004* (2013.01);
(Continued)

(58) Field of Classification Search
CPC ............ G03G 15/205; G03G 15/2039; G03G 15/5004; G03G 2215/00978;
(Continued)

(56) References Cited

U.S. PATENT DOCUMENTS 5,329,343 A 7/1994 Saito
5,512,993 A * 4/1996 Endo ................. G03G 15/2039 432/60
(Continued)

FOREIGN PATENT DOCUMENTS

CN 1497392 A 5/2004
JP 2000-243537 A 9/2000
(Continued)

OTHER PUBLICATIONS

Co-pending U.S. Appl. No. 17/867,899, filed Jul. 19, 2022.
Co-pending U.S. Appl. No. 17/867,912, filed Jul. 19, 2022.

*Primary Examiner* — Robert B Beatty
(74) *Attorney, Agent, or Firm* — Venable LLP

(57) ABSTRACT

In a caser where a first current is supplied to a first heater, a controller gradually increases the first current in a first period, supplies the first current based on a first duty cycle in a second period, and gradually reduces the first current to stop supplying the first current in a third period. In a case where a second current is supplied to a second heater, the controller gradually increases the second current in a fourth period, supply the second current based on a second duty cycle in a fifth period, and gradually reduces the second current to stop supplying the second current in a sixth period. The controller controls the supply of the second current such that part of the fourth period overlaps with the third period.

9 Claims, 11 Drawing Sheets

(51) Int. Cl.

| | |
|---|---|
| ***H05B 41/00*** | (2006.01) |
| ***H05B 47/00*** | (2020.01) |
| ***G03G 15/00*** | (2006.01) |
| ***H05B 1/02*** | (2006.01) |
| ***H05B 41/24*** | (2006.01) |
| ***H05B 3/00*** | (2006.01) |
| ***H05B 41/38*** | (2006.01) |
| ***H05B 47/155*** | (2020.01) |

(52) U.S. Cl.
CPC ......... *H05B 1/0241* (2013.01); *H05B 3/0066* (2013.01); *H05B 41/245* (2013.01); *H05B 41/382* (2013.01); *H05B 47/155* (2020.01); *G03G 2215/2038* (2013.01)

(58) Field of Classification Search
CPC .... H05B 1/0241; H05B 3/0066; H05B 39/02; H05B 39/06; H05B 41/245; H05B 41/382; H05B 41/392; H05B 41/3924; H05B 47/155
USPC ....... 399/69, 70, 88; 219/216, 477, 480, 486
See application file for complete search history.

(56) References Cited

U.S. PATENT DOCUMENTS

| | | | | |
|---|---|---|---|---|
| 6,301,454 | B1 | 10/2001 | Nishida et al. | |
| 6,654,572 | B2 | 11/2003 | Kataoka | |
| 6,900,419 | B2 | 5/2005 | Takagi et al. | |
| 10,139,759 | B2 | 11/2018 | Tamaki | |
| 2002/0085852 | A1 | 7/2002 | Kataoka | |
| 2005/0013622 | A1 | 1/2005 | Omoto et al. | |
| 2008/0069584 | A1 | 3/2008 | Sanada | |
| 2010/0028037 | A1 | 2/2010 | Song | |
| 2010/0061754 | A1 * | 3/2010 | Ishigaya | G03G 15/2039 399/70 |
| 2011/0142475 | A1 * | 6/2011 | Kim | G03G 15/80 399/69 |
| 2016/0357135 | A1 | 12/2016 | Yamamoto | |
| 2018/0253040 | A1 | 9/2018 | Tamaki | |
| 2021/0200125 | A1 * | 7/2021 | Harada | G03G 15/2042 |
| 2021/0278794 | A1 | 9/2021 | Nakajima | |
| 2023/0023564 | A1 | 1/2023 | Miyamoto | |
| 2023/0251593 | A1 | 8/2023 | Uehara | |

FOREIGN PATENT DOCUMENTS

| | | | |
|---|---|---|---|
| JP | 2002182520 | A | 6/2002 |
| JP | 2010096969 | A | 4/2010 |
| JP | 4980165 | B2 | 7/2012 |
| JP | 5133015 | B | 1/2013 |
| JP | 2017021173 | A | 1/2017 |
| JP | 2018146712 | A | 9/2018 |
| JP | 2020-052247 | A | 4/2020 |
| JP | 2021-056274 | A | 4/2021 |

* cited by examiner

IMAGE FORMING APPARATUS THAT FIXES TONER IMAGE TO RECORDING MEDIUM USING FIRST AND SECOND HEATERS SUPPLIED WITH CURRENT DURING OVERLAPPING TIME PERIODS

BACKGROUND OF THE INVENTION

Field of the Invention

The present disclosure relates to an image forming apparatus that fixes a toner image to a recording medium using a heater.

Description of the Related Art

A fixing device uses a plurality of heaters to apply heat to a toner image and a sheet to fix the toner image onto the sheet. If the heaters can reach a target temperature in a short time, the user will have a shorter waiting time. Therefore, the heaters are supplied with a large current from an AC power source. Here, when the plurality of heaters are turned on simultaneously, what is known as a flicker phenomenon may occur. "Flicker phenomenon" refers to a phenomenon in which the operations of other devices connected to an AC power source are affected by fluctuations in the AC power source voltage caused by inrush current and the like occurring in electrical devices connected to the AC power source. Flickering of lighting devices can be given as a typical example of the flicker phenomenon. Japanese Patent Laid-Open No. 2010-96969 proposes that operating periods of a plurality of heaters should not overlap, and that soft-starts and soft-stops should gradually increase or gradually reduce the power supplied to each heater. This is said to eliminate harmonic current.

However, in Japanese Patent Laid-Open No. 2010-96969, when the first heater is turned off, the second heater is immediately turned on, and thus flicker still arises.

SUMMARY OF THE INVENTION

The present disclosure provides an image forming apparatus comprising: an image forming unit that forms an image on a sheet; a fixing unit that fixes the image to the sheet, the fixing unit including: a first heater to which is supplied current for generating heat; and a second heater to which is supplied current for generating heat; a temperature sensor that detects a temperature of the fixing unit; and a controller configured to: control a first current supplied to the first heater and a second current supplied to the second heater such that the temperature detected by the temperature sensor maintains a target temperature; in a case where the first current is supplied to the first heater, gradually increase the first current in a first period, supply the first current based on a first duty cycle in a second period that follows the first period, and gradually reduce the first current to stop supplying the first current in a third period that follows the second period; in a case where the second current is supplied to the second heater, gradually increase the second current in a fourth period, supply the second current based on a second duty cycle in a fifth period that follows the fourth period, and gradually reduce the second current to stop supplying the second current in a sixth period that follows the fifth period; and control the supply of the second current such that part of the fourth period overlaps with the third period.

Further features of the present disclosure will become apparent from the following description of exemplary embodiments (with reference to the attached drawings).

DESCRIPTION OF THE EMBODIMENTS

Figure 1:
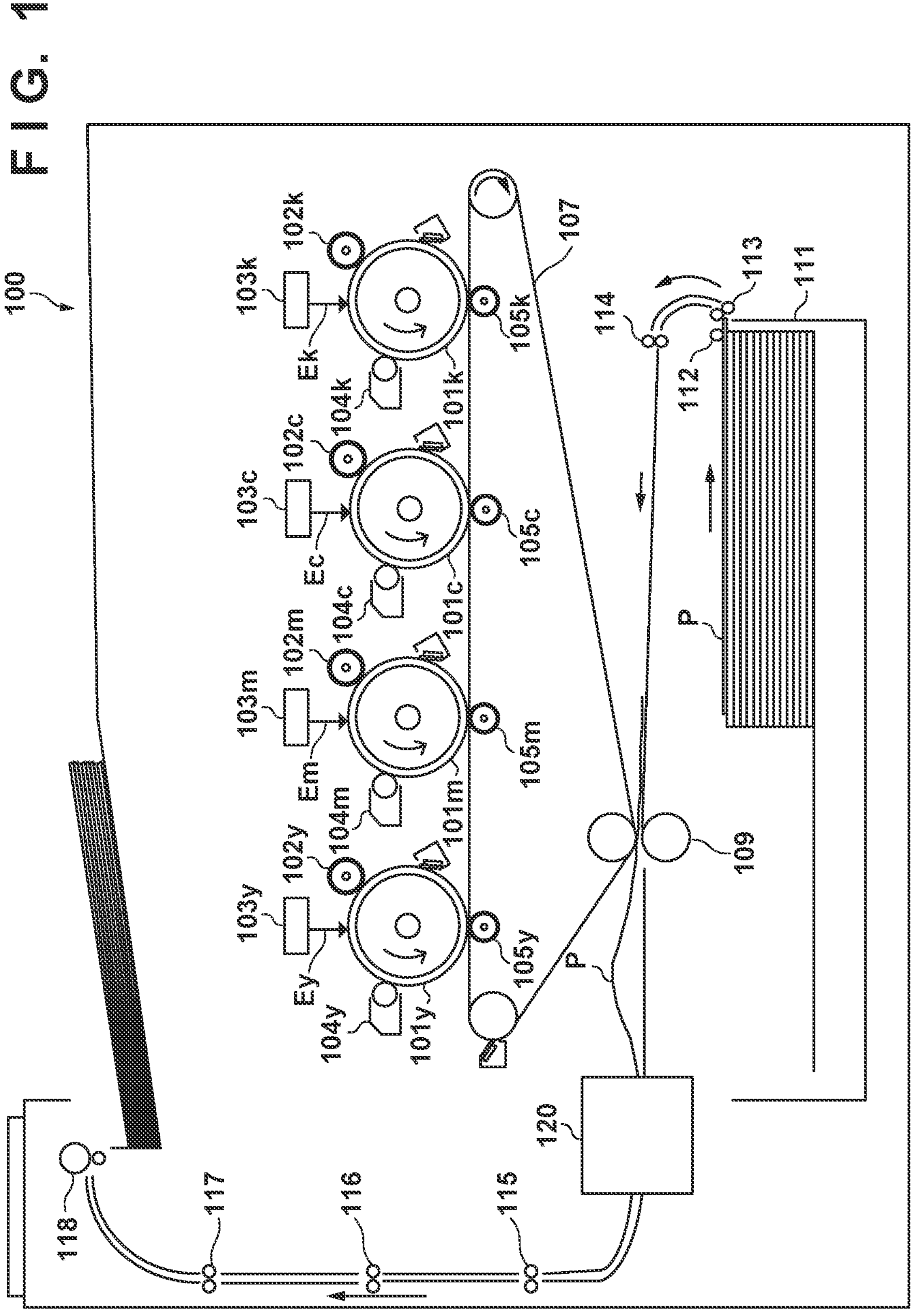
FIG. 1 is a diagram illustrating an image forming apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Image Forming Apparatus

As illustrated in FIG. 1, an image forming apparatus 100 is an electrophotographic printer having four image forming stations. The image forming apparatus 100 may be commercialized as a copier, a multifunction peripheral, a facsimile device, or the like. Here, the first station forms a yellow "y" image. The second station forms a magenta "m" image. The third station forms a cyan "c" image. The fourth station forms a black "k" image. The operations and configurations of the four stations are identical or similar. Therefore, when matters common to all four colors are described, the letters y, m, c, and k will be omitted from the reference signs. The technical spirit of the present invention is also applicable to monochrome printers.

A photosensitive drum 101 is a rotating photosensitive member and image carrier that carries an electrostatic latent image and a toner image. A charging roller 102 is a charging member that uniformly charges the surface of the photosensitive drum 101. An exposure unit 103 emits a laser beam E according to an image signal to the photosensitive drum 101 and forms an electrostatic latent image on the surface of the photosensitive drum 101. A developer 104 adheres toner to the electrostatic latent image to form the toner image. A primary transfer roller 105 transfers the toner image from the photosensitive drum 101 to an intermediate transfer belt 107. That is, a full-color image is formed by transferring a yellow toner image, a magenta toner image, a cyan toner image, and a black toner image in order to the intermediate transfer belt 107. When the intermediate transfer belt 107 rotates, the toner image is transported to a secondary transfer part. A secondary transfer roller pair 109 is provided at the secondary transfer part.

A sheet cassette 111 is a sheet holder that can accommodate a large number of sheets P. A pickup roller 112 feeds a sheet P from the sheet cassette 111 to a transport path. A sheet feed roller 113 transports the sheet P downstream while suppressing overlapping transport of the sheets P. "Downstream" refers to being downstream in a transport direction of the sheets P. A resist roller 114 is a transport roller that reduces skew of the sheet P. The leading edge of the sheet P in the transport direction of the sheet P is pushed against the resist roller 114, which corrects skew in the sheet P. The sheet P is then transported to the secondary transfer part.

At the secondary transfer part, the secondary transfer roller pair 109 transfers the toner image from the intermediate transfer belt 107 to the sheet P. A fixing device 120 fixes the toner image to the sheet P by applying heat and pressure to the sheet P and the toner image. Transport rollers 115, 116, and 117 are disposed downstream from the fixing device 120 and transport the sheet P to a discharge roller 118. The discharge roller 118 is used to transport the sheet P to the exterior of the image forming apparatus 100 (e.g., a sheet tray).

Fixing Device

Figure 2:
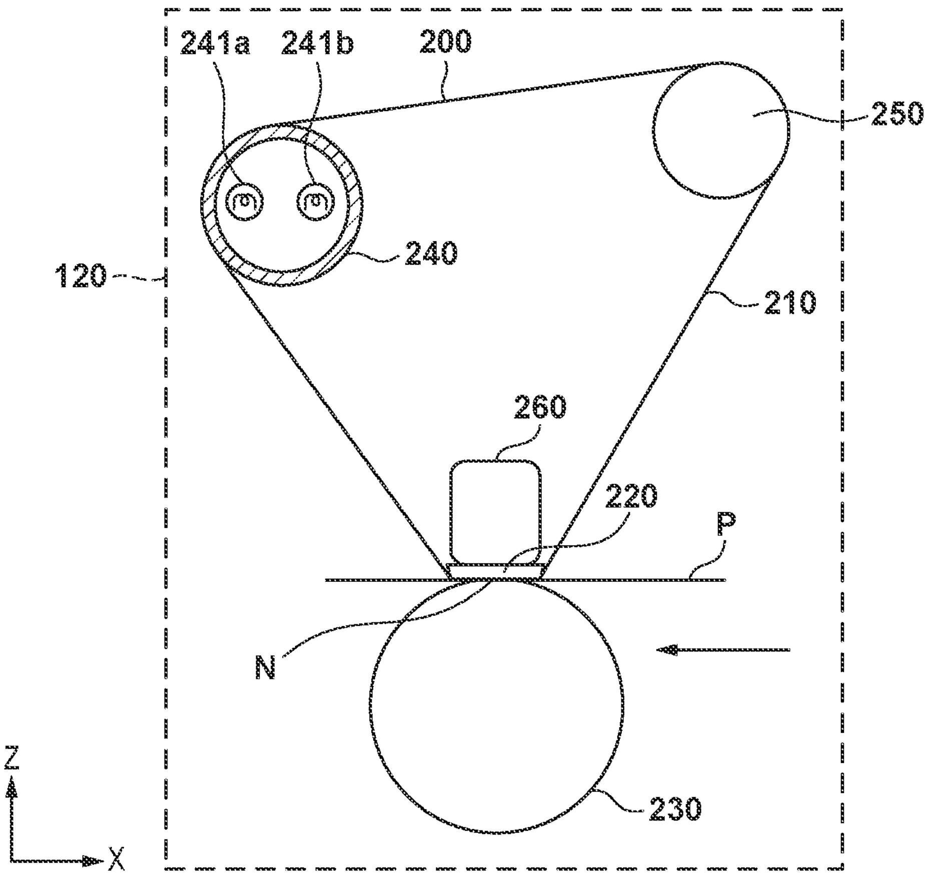
FIG. 2 is a diagram illustrating a fixing device.

As illustrated in FIG. 2, the fixing device 120 has a heating unit 200 centered on a rotatable endless fixing belt 210 that serves as a heat conduction medium. In FIG. 2, the Z direction is the height direction, and the X direction is parallel to the transport direction of the sheets P. The fixing belt 210 is stretched over a pad 220, a heating roller 240, and a tension roller 250. The heating roller 240 is a heating rotating body that includes heaters 241*a* and 241*b* within. The heaters 241*a* and 241*b* are heat sources such as halogen heaters. A halogen heater is a heater having a halogen lamp as a heater. The heating roller 240 heats the fixing belt 210. The heating roller 240 is rotated by rotational power supplied from a motor or the like. The tension roller 250 is a tension roller that applies a predetermined tension to the fixing belt 210. The tension roller 250 is biased by an elastic body (e.g., a spring) supported by a frame (not shown) of the heating unit 200. The tension of this spring is, for example, 50 N. The tension roller 250 rotates driven by the fixing belt 210. The pad 220 supports an inner circumferential surface of the fixing belt 210 by a metal stay 260. Together with a pressure roller 230, the pad 220 sandwiches the fixing belt 210. What is known as a substantially flat nip part N is formed between the pad 220 and the pressure roller 230. At least one of the pressure roller 230 or the pad 220 may be biased by a biasing mechanism (not shown) such that the nip part N is formed at a predetermined length and width. Pressure and heat are applied to the sheet P and the toner image as the sheet P, to which the toner image has been transferred, passes through the nip part N. As a result, the toner image is fixed onto the sheet P.

The fixing belt 210 has thermal conductivity and heat resistance. The fixing belt 210 has a thin-walled cylindrical shape, the inner diameter of which is, for example, 120 mm. The fixing belt 210 may employ a three-layer structure having a base layer, an elastic layer provided on the outer circumference of the base layer, and a release layer provided on the outer circumference of the elastic layer. The thickness of the base layer is, for example, 60 μm. The material of the base layer is, for example, polyimide resin (PI). The thickness of the elastic layer is, for example, 300 μm. The material of the base layer is, for example, silicone rubber. The thickness of the release layer is, for example, 30 μm. The material of the release layer is, for example, fluorine resin. For example, PFA (polyfluoroethylene tetrafluoride/perfluoroalkoxyethylene copolymerization resin) can be used as the fluorine resin.

The material of the pad 220 is, for example, LCP (liquid crystal polymer) resin. The heating roller 240 may be a stainless steel pipe. The outer diameter of the pipe may be, for example, 40 mm. The thickness of the pipe may be, for example, 1 mm. One or more other heaters aside from the heater 241*a* and the heater 241*b* may be disposed inside the pipe. The heat supplied by the plurality of heaters including the heater 241*a* and the heater 241*b* is conducted from the heating roller 240 to the fixing belt 210, and then from the fixing belt 210 to the sheet P and the toner image. The tension roller 250 may also be formed as a stainless steel pipe. The outer diameter of the pipe is, for example, 40 mm. The thickness of the pipe is, for example, 1 mm. The ends of the pipe may be rotatably supported by bearings (not shown).

The pressure roller 230 is, for example, a roller having an elastic layer and a release layer. The elastic layer is provided around the outer circumference of the rotating shaft of the pressure roller 230. Furthermore, the release layer is provided around the outer circumference of the elastic layer. The material of the rotating shaft may be metal (e.g., stainless steel). The thickness of the elastic layer is, for example, 5 mm. The material of the elastic layer is, for example, conductive silicone rubber. The thickness of the release layer is, for example, 50 μm. The material of the release layer is, for example, fluorine resin such as PFA.

Controller

Figure 3:
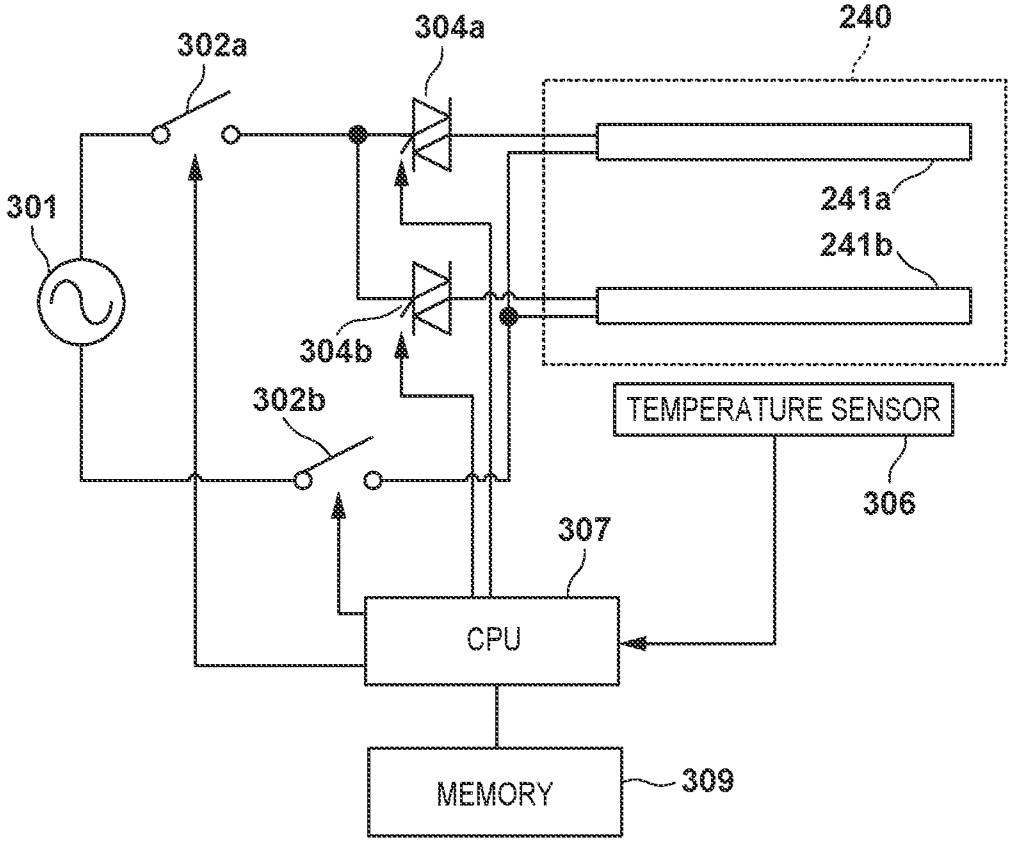
FIG. 3 is a diagram illustrating a controller involved in heater control.

FIG. 3 illustrates a controller that controls the heaters 241*a* and 241*b*. Here, a CPU 307 controls the heaters 241*a* and 241*b* according to a control program stored in a ROM region of memory 309. The memory 309 can include non-volatile memory (ROM), volatile memory (RAM), solid state drives (SSD), and hard disk drives (HDD).

AC supplied from an AC power source 301, such as a commercial power source, is supplied to the heaters 241*a* and 241*b* via switches 302*a* and 302*b*, which are relays or the like, and switches 304*a* and 304*b*, which are triacs or the like. The switches 302*a* and 302*b* are main switches and are always controlled to be on when heating the fixing device 120. The operation modes of the image forming apparatus 100 include an image forming mode in which images are formed and a standby mode in which no images are formed. The switches 302*a* and 302*b* are on in both the image forming mode and the standby mode. When the image forming apparatus 100 is stopped (shut down) by the user, the switches 302*a* and 302*b* turn off.

The switch 304*a* is turned on/off by the CPU 307 to control the power supplied to the heater 241*a*. The switch 304*b* is turned on/off by the CPU 307 to control the power supplied to the heater 241*b*. The switches 304*a* and 304*b* may be switching elements such as triacs, thyristors, transistors, and insulated gate bipolar transistors (IGBTs), for example. However, any switching element can be employed as the switches 304*a* and 304*b* as long as the switches can be controlled from the CPU 307 and have performance (rated voltage and rated current) commensurate with the power consumption of the heaters 241*a* and 241*b*.

A temperature sensor 306 is a thermistor or the like that detects the temperature of the heating roller 240. The CPU 307 turns on/off the switches 304*a* and 304*b* so that the temperature of the heating roller 240 stays at a target temperature. The target temperature is stored in the ROM region of the memory 309. The target temperature may be changed according to the size of the sheet P and the grammage of the sheet P. The memory 309 stores control information indicating energization patterns of the heaters 241*a* and 241*b*. The CPU 307 may select the energization pattern according to the temperature detected by the temperature sensor 306.

Temperature-Dependent Characteristics of Heater Resistance Value

Figure 4A:
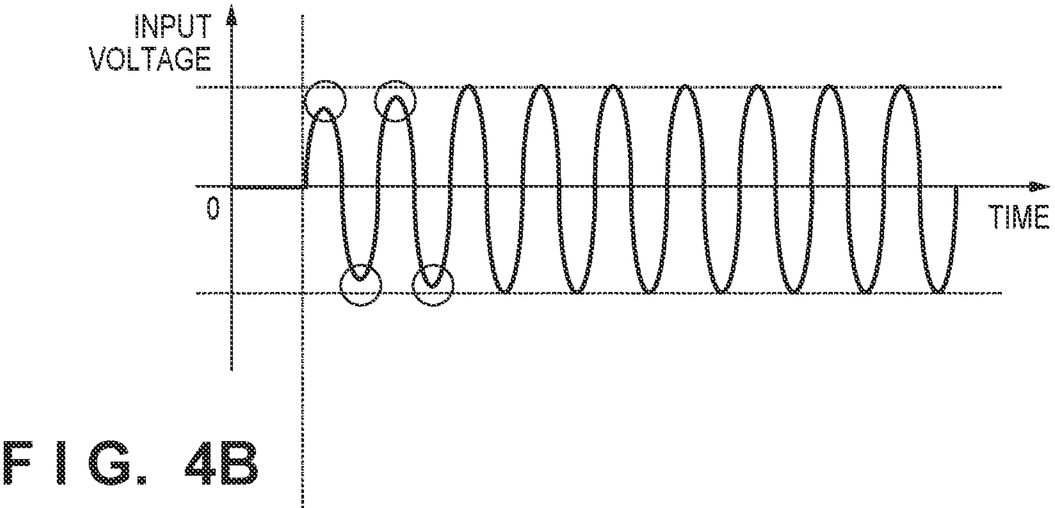
FIGS. 4A to 4C are diagrams illustrating changes in current, voltage, and resistance of a heater.
Figure 4B:
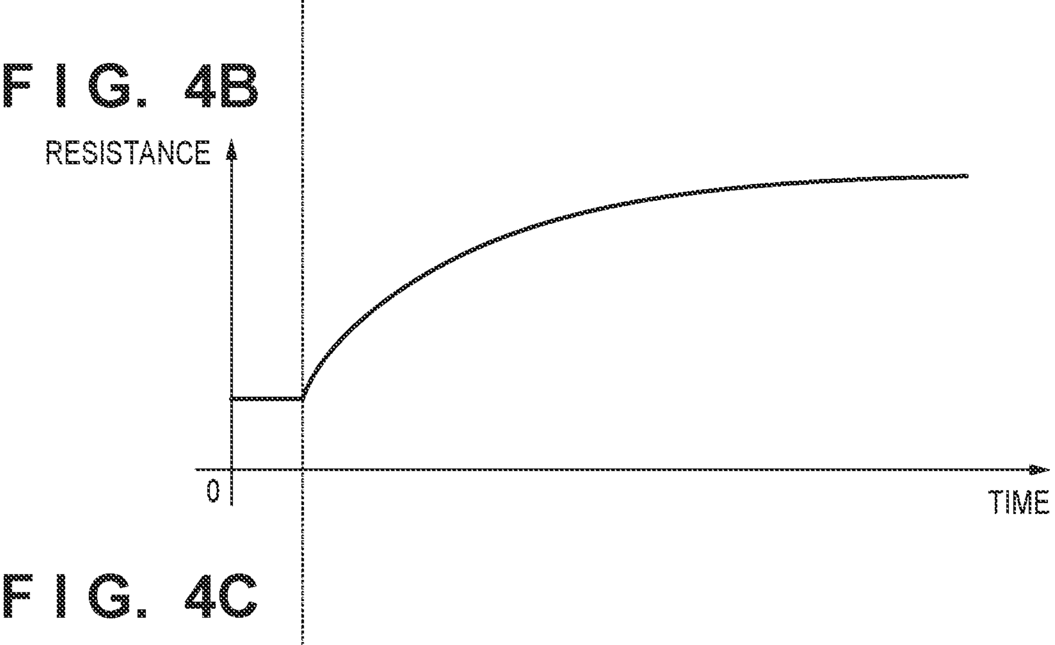
Figure 4C:
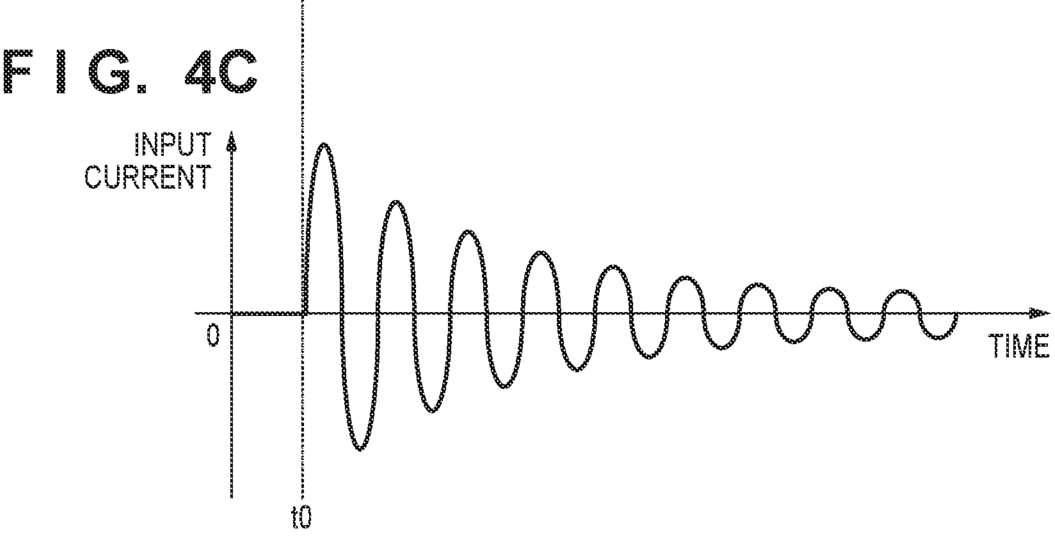

FIG. 4A illustrates changes in AC voltage applied to a halogen heater. FIG. 4B illustrates changes in a resistance value of the halogen heater. FIG. 4C illustrates changes in current flowing in the halogen heater. When the halogen heater switches from off to on, a large current, called "inrush current", flows in the halogen heater. The resistance value of the halogen heater has a temperature-dependent characteristic. In a period before time t0, no AC current flows in the halogen heater. Therefore, the temperature of the halogen heater matches the ambient temperature. Thus, as illustrated in FIG. 4B, the resistance value of the halogen heater is relatively low. When the halogen heater is switched from off to on at time to, alternating current flows in the halogen heater, as illustrated in FIG. 4C. At this time, the resistance value of the halogen heater is still low, and thus inrush current is produced. Because inrush current flows at time t0, the AC voltage (supply voltage) input to the halogen heater drops, as indicated by the circled part in FIG. 4A. This causes flicker. Therefore, in order to switch the heaters 241*a* and 241*b* from off to on, it is necessary to take measures to reduce this flicker.

Anti-Flicker

Figure 5A:
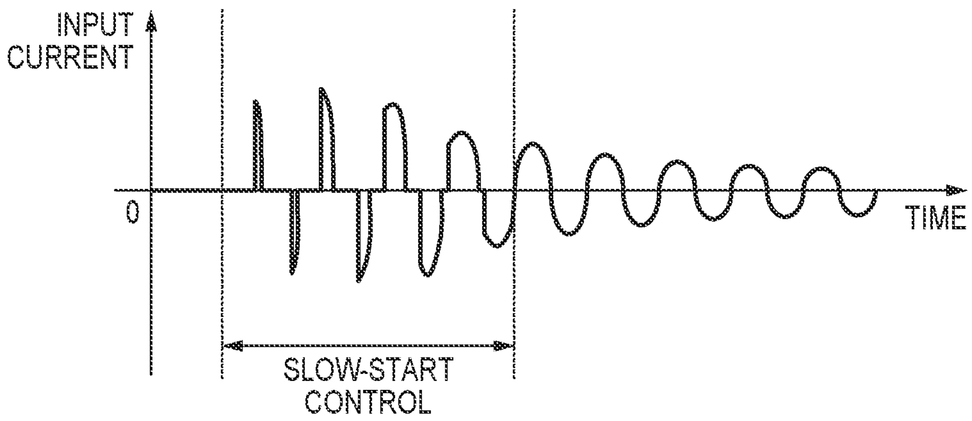
FIGS. 5A and 5B are diagrams illustrating slow-start control and slow-end control.

FIG. 5A is a diagram illustrating slow-start control. "Slow-start control" refers to control for gradually increasing the power supplied to a halogen heater when the halogen heater is switched from off to on. Here, an energization time (energization phase angle) is gradually increased for each half cycle (half wave) of AC. This suppresses inrush current and reduces AC voltage fluctuations and flicker.

Figure 5B:
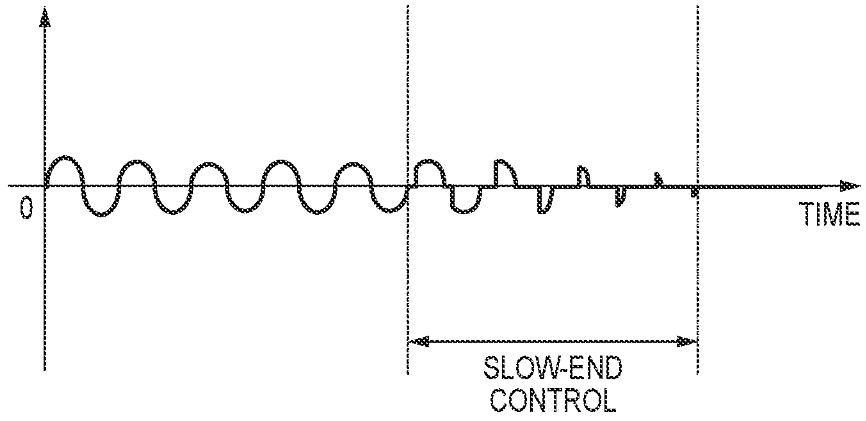

FIG. 5B is a diagram illustrating slow-end control. "Slow-end control" refers to control for gradually reducing the power supplied to a halogen heater to switch the halogen heater from on to off. Here, the energization time (energization phase angle) is gradually reduced for each half cycle (half wave) of AC. This reduces AC voltage fluctuations and flicker produced by the halogen heater.

Figure 6A:
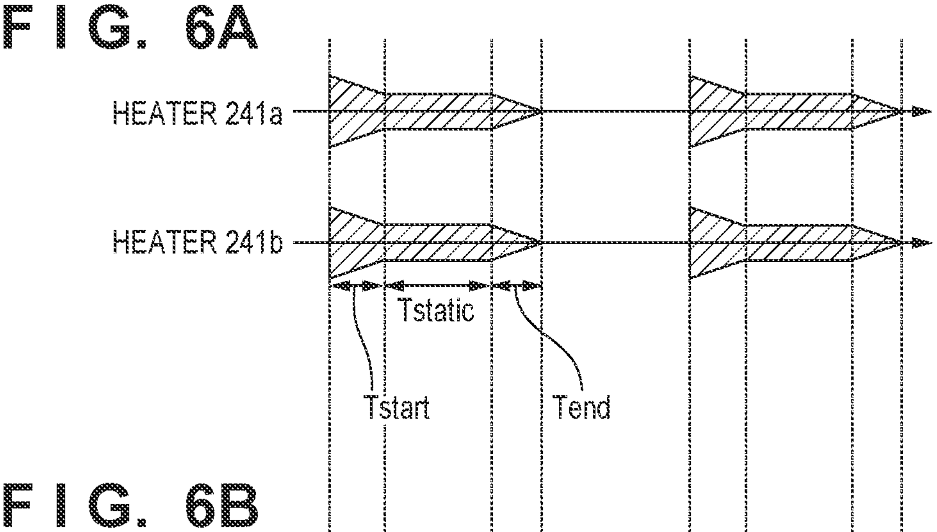
FIGS. 6A and 6B are diagrams illustrating flicker associated with driving a plurality of heaters.
Figure 6B:
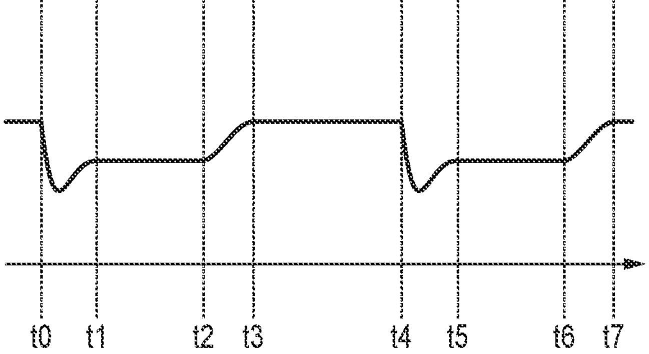

FIG. 6A illustrates changes in input current (heater current) when slow-start control and slow-end control are applied to the heaters 241*a* and 241*b*. FIG. 6B illustrates changes in input voltage (supply voltage) when slow-start control and slow-end control are applied to the heaters 241*a* and 241*b*. Here, the heaters 241*a* and 241*b* are turned on simultaneously at time t0 and time t4. The heaters 241*a* and 241*b* are turned off simultaneously at time t3 and time t7. The period from time t0 to time t1 and the period from time t4 to time t5 are periods during which slow-start control is applied and may be called "slow-start periods". The period from time t2 to time t3 and the period from time t5 to time t7 are periods during which slow-end control is applied and may be called "slow-end periods". The period from time t1 to time t2 and the period from time t5 to time t6 may be called "static periods". The period from time t0 to time t3 and the period from time t4 to time t7 are called "operating periods". In FIG. 6A, the slow-start period, the slow-end period, and the static period are denoted as Tstart, Tend, and Tstatic, respectively. Tstart, Tend, and Tstatic may be understood as variables indicating the temporal length of the slow-start period, the slow-end period, and the static period.

As illustrated in FIGS. 6A and 6B, flicker is reduced by applying slow-start control and slow-end control. However, the flicker does not disappear completely because the heaters 241*a* and 241*b*, which are connected to the same power system, are turned on/off simultaneously.

Figure 7A:
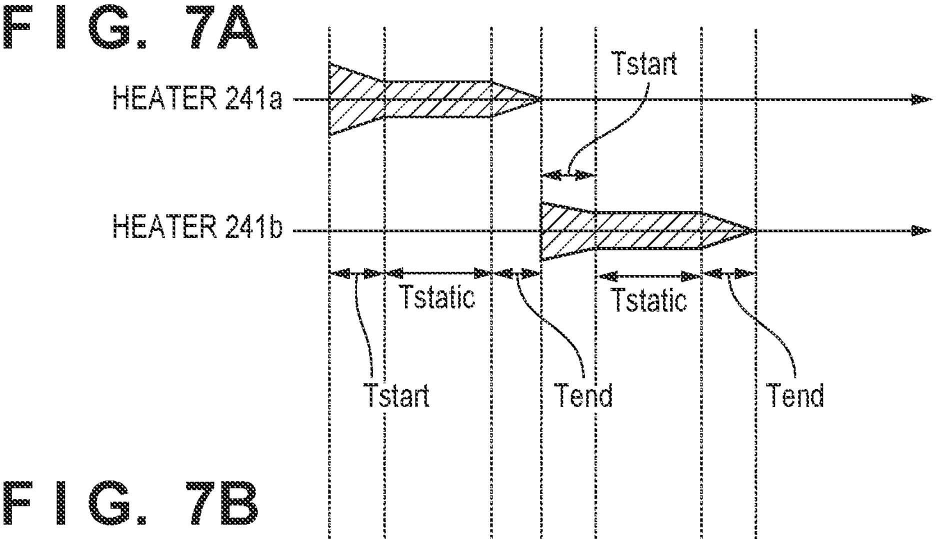
FIGS. 7A and 7B are diagrams illustrating flicker associated with alternately operating a plurality of heaters.
Figure 7B:
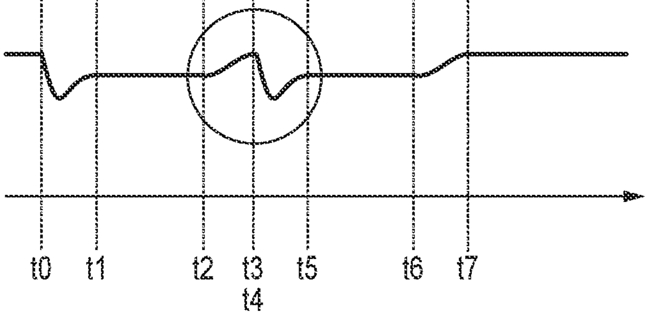

FIG. 7A illustrates changes in input current when slow-start control and slow-end control are applied to the heaters 241*a* and 241*b*. FIG. 7B illustrates changes in input voltage when slow-start control and slow-end control are applied to the heaters 241*a* and 241*b*. Here, the operating period of the heater 241*a* and the operating period of the heater 241*b* are staggered so as not to overlap. In other words, when the heater 241*a* turns off, the heater 241*b* is switched on. As a result, during the period from time t0 to time t1 and the period from time 16 to time t7, voltage fluctuations in the AC power source 301 decrease, and flicker is reduced as a result. However, new flicker occurs in the circled part.

Figure 8A:
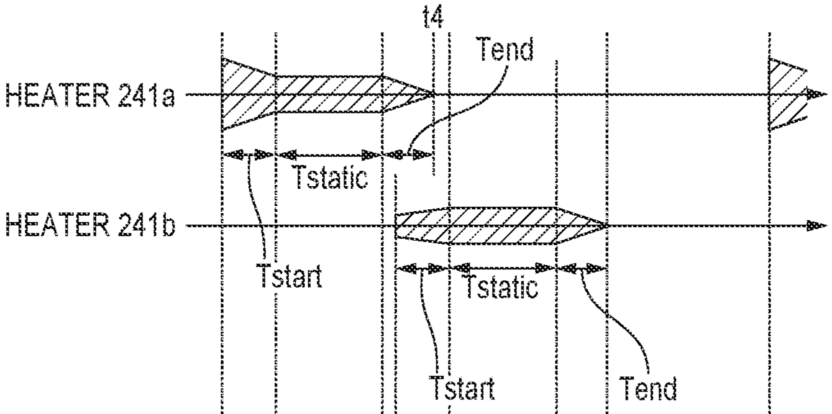
FIGS. 8A to 8C are diagrams illustrating overlap produced between part of a slow-start period and part of a slow-end period.
Figure 8B:
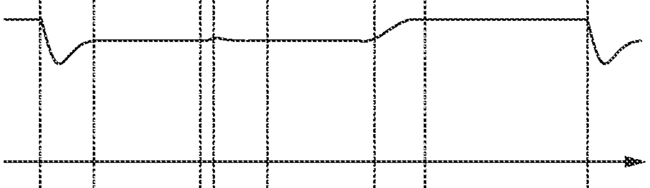
Figure 8C:
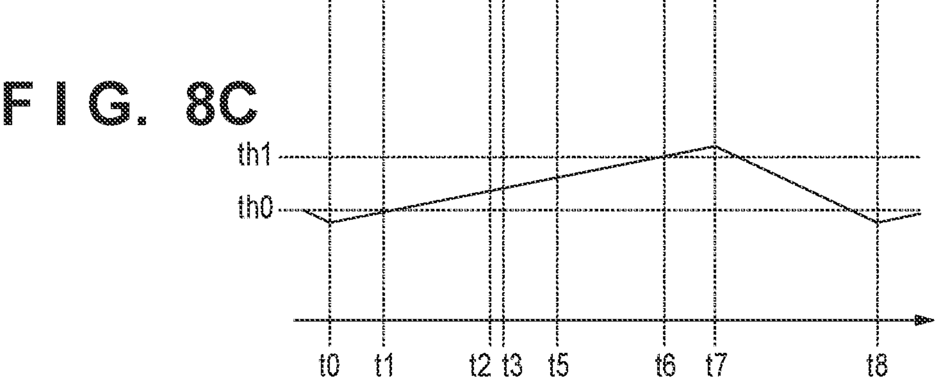

FIG. 8A illustrates changes in input current when slow-start control and slow-end control are applied to the heaters 241*a* and 241*b*. FIG. 8B illustrates changes in input voltage when slow-start control and slow-end control are applied to the heaters 241*a* and 241*b*. FIG. 8C illustrates the temperature detected by the temperature sensor 306. Compared to FIG. 7A, in FIG. 8A, the slow-end period of the heater 241*a* and the slow-start period of the heater 241*b* overlap.

Figure 9:
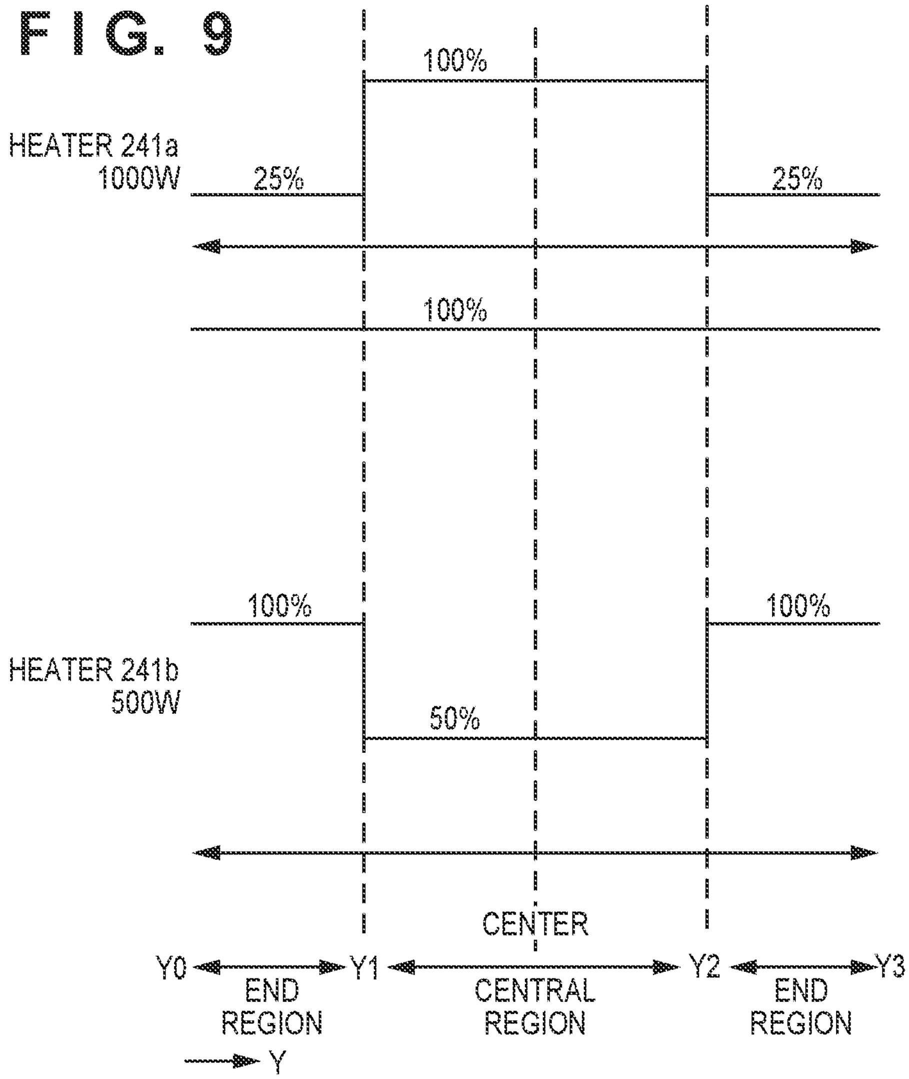
FIG. 9 is a diagram illustrating a power orientation of a plurality of heaters.

FIG. 9 illustrates the orientation of heater power (heater output) for the heaters 241*a* and 241*b*. Here, "heater power orientation" refers to the distribution of heat generation performance (heat generation distribution characteristics) in the direction in which the heaters 241*a* and 241*b* extend (an axial direction). In FIG. 9, arrow Y indicates the direction in which the heaters 241*a* and 241*b* extend. Y0 to Y1 indicates one end region of the heaters 241*a* and 241*b*. Y1 to Y2 indicates a central region of the heaters 241*a* and 241*b*. Y2 to Y3 indicates another end region of the heaters 241*a* and 241*b*. The heat generation capacity (heater power) at the central region of the heater 241A is higher than the heat generation capacity of both end regions of the heater 241A. The heat generation capacity of the central region of the heater 241*b* is lower than the heat generation capacity of both end regions of the heater 241*b*. The entire surface region of the heating roller 240 in the direction in which the roller extends (the Y direction) is uniformly heated by the heaters 241*a* and 241*b* turning on in an alternating manner.

As illustrated in FIG. 8C, at time t0, the temperature in the vicinity of the heating roller 240 is below a starting threshold th0. Therefore, the CPU 307 starts turning on the heater 241*a*. As illustrated in FIG. 8A, during the slow-start period from time t0 to time t1, the CPU 307 executes slow-start control. This suppresses inrush current flowing in the heater 241*a*, as illustrated in FIG. 8B. Here, "slow-start control" is control that gradually increases the width of an energization period occupying the half cycle of the AC voltage, in each half cycle. The energization period may be called the "duty cycle" or the "energization phase angle". During the slow-start period, the current supplied to the heater 241*a* is gradually increased. As a result, inrush current flowing in the heater 241*a* is suppressed and flicker is reduced. For example, if the slow-start period is 1 second, the duty cycle of the heater 241*a* may be broadened by 10% every 100 ms.

The duty cycle broadens gradually in slow-start control, and the temperature in the vicinity of the heating roller 240 also rises gradually.

Slow-start control ends at time t1. As illustrated in FIG. 8A, the slow-end period is the period from time t2 to time t4. The length of the slow-start period may be a predetermined period stored in the memory 309. The period from time t1 to time t2 is the static period. In the static period, the duty cycle is fixed to a predetermined value stored in the memory 309. The length of the static period is also fixed to a predetermined value stored in the memory 309. As a result, the temperature in the vicinity of the heating roller 240 rises further, as illustrated in FIG. 8C. The CPU 307 monitors whether the temperature detected by the temperature sensor 306 reaches a target temperature th1 while keeping the duty cycle at the predetermined value. Here, it is assumed that the temperature in the vicinity of the heating roller 240 has not reached the target temperature even after a predetermined time (the static period) has passed. Accordingly, at time t2, the CPU 307 switches the control of the heater 241*a* from static control to slow-end control. In slow-end control, the duty cycle gradually narrows. For example, in slow-end control, the duty cycle occupying the half cycle of the AC voltage gradually decreases with each half cycle. As a result, in slow-end control, the current flowing in the heater 241*a* gradually decreases. Accordingly, sudden changes in current are suppressed and flicker is reduced. For example, if the slow-end period is 1 second, the duty cycle of the heater 241*a* may decrease by 10% every 100 ms.

According to FIG. 8C, at time t3, before time t4 when the slow-end period ends, the CPU 307 starts turning on the heater 241*b*. To suppress inrush current flowing in the heater 241*b*, the CPU 307 applies slow-start control to the heater 241*b* for a predetermined time as well. The slow-start period for the heater 241*b* is a predetermined period from time t3 to time t5. As a result of slow-start control, the duty cycle of the heater 241*b* increases gradually, and the temperature in the vicinity of the heating roller 240 rises gradually. At time t5, the CPU 307 ends slow-start control of the heater 241*b*. In other words, the CPU 307 switches the control of the heater 241*b* from slow-start control to static control. In static control, the duty cycle is kept constant.

In the period from time t2 to time t4, the CPU 307 causes the slow-end period of the heater 241*a* and the slow-start period of the heater 241*b* to overlap. As a result, as illustrated in FIG. 8B, supply voltage fluctuations caused by the heater 241*a* turning on/off and the heater 241*b* turning off/on are reduced. In other words, flicker is reduced. Time t3, when the slow-start period of the heater 241*b* starts, is any timing within the slow-end period of the heater 241*b*. Specifically, time t3 is selected experimentally or through a simulation such that the flicker is sufficiently low.

During the execution of static control, the CPU 307 determines whether the temperature detected by the temperature sensor 306 has reached the target temperature th1. In FIG. 6C, the temperature in the vicinity of the heating roller 240 reaches the target temperature at time t6, which is earlier than a time serving as a limit value of the static period. As a result, the CPU 307 switches the control of the heater 241*b* from static control to slow-end control. The slow-end period of the heater 241*b* (from time t6 to time t7) is also constant. The duty cycle of the heater 241*b* is gradually reduced by slow-end control. At time t7, CPU 307 ends slow-end control. Thereafter, the temperature in the vicinity of the heating roller 240 gradually decreases. The energization of the heater 241*a* and the heater 241*b* is stopped until the temperature in the vicinity of the heating roller 240 reaches the starting threshold th0. At time t8, when the temperature in the vicinity of the heating roller 240 reaches the starting threshold th0, the CPU 307 starts turning on the heater 241*a* again. The control from time t0 to time t8 is then repeated.

Incidentally, according to FIG. 8A, the change in input current during the slow-start period of the heater 241*a* is different from the change in input current during the slow-start period of the heater 241*b*. This is because the temperature of the heater 241*a* at the starting timing of the slow-start period of the heater 241*a* is lower than the temperature of the heater 241*b* at the starting timing of the slow-start period of the heater 241*b*. As illustrated in FIG. 4B, the resistance values of the heaters 241*a* and 241*b* have temperature dependence. Therefore, the current flowing when the temperature of the heaters 241A and 241B is high is less than the current flowing when the temperature of the heaters 241A and 241B is low. In other words, the change in input current during the slow-start period of the heater 241*a* is different from the change in input current during the slow-start period for the heater 241*b*.

CPU Functions

Figure 10:
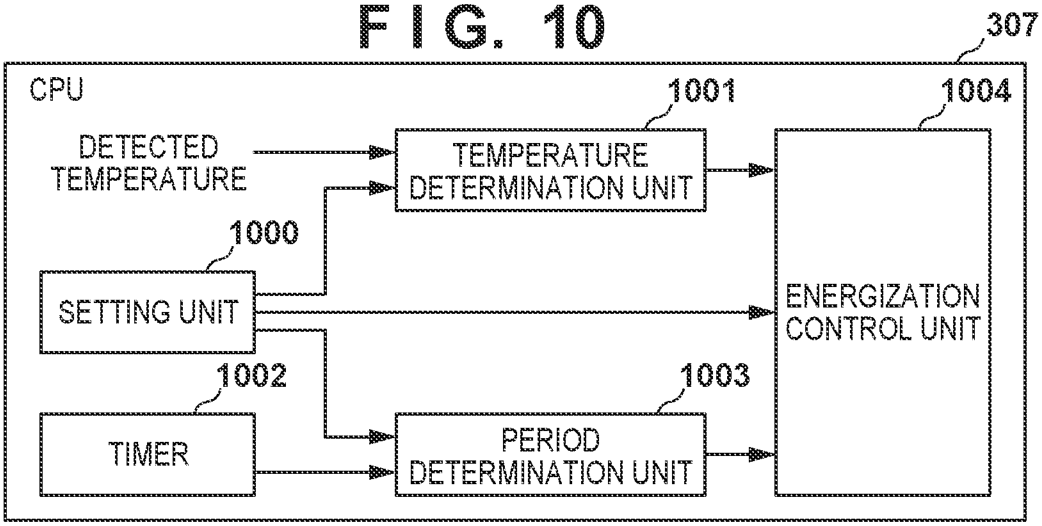
FIG. 10 is a diagram illustrating functions of a CPU.

FIG. 10 illustrates functions implemented by the CPU 307 according to the control program. A setting unit 1000 sets the target temperature Th1, the starting threshold th0, and the like in a temperature determination unit 1001, sets the length of the period (a period threshold) in a period determination unit 1003, and the like. Here, the "length of the period" is a threshold used for period determination in the period determination unit 1003, such as the length of the slow-start period, the length of the static period, the length of the slow-end period, and the like. The target temperature th1, the starting threshold th0, and the length of each period are stored in the ROM region of the memory 309. The temperature determination unit 1001 compares a detected temperature obtained by the temperature sensor 306 with the threshold set by the setting unit 1000, and outputs the comparison result to an energization control unit 1004. The period determination unit 1003 compares a timer value of a timer 1002 with the threshold set by the setting unit 1000 and outputs the comparison result to the energization control unit 1004. The energization control unit 1004 controls the current supplied to the heaters 241*a* and 241*b* based on the determination result of the temperature determination unit 1001 and the determination result of the period determination unit 1003. For example, the energization control unit 1004 selects one of slow-start control, static control, and slow-end control as the control applied to the heaters 241*a* and 241*b*. The setting unit 1000 sets a rate of change of the duty cycle applied in slow-start control (%/sec), a constant duty cycle applied in static control (%), and a rate of change of the duty cycle applied in slow-end control (%/sec) in the energization control unit 1004. The setting unit 1000 may obtain the rate of change in the duty cycle applied in slow-start control (%/sec), the duty cycle applied in static control (%), and the rate of change in the duty cycle applied in slow-end control (%/sec) from the memory 309. The units for the rate of change in the duty cycle may be %/half cycle.

Flowcharts

Figure 11:
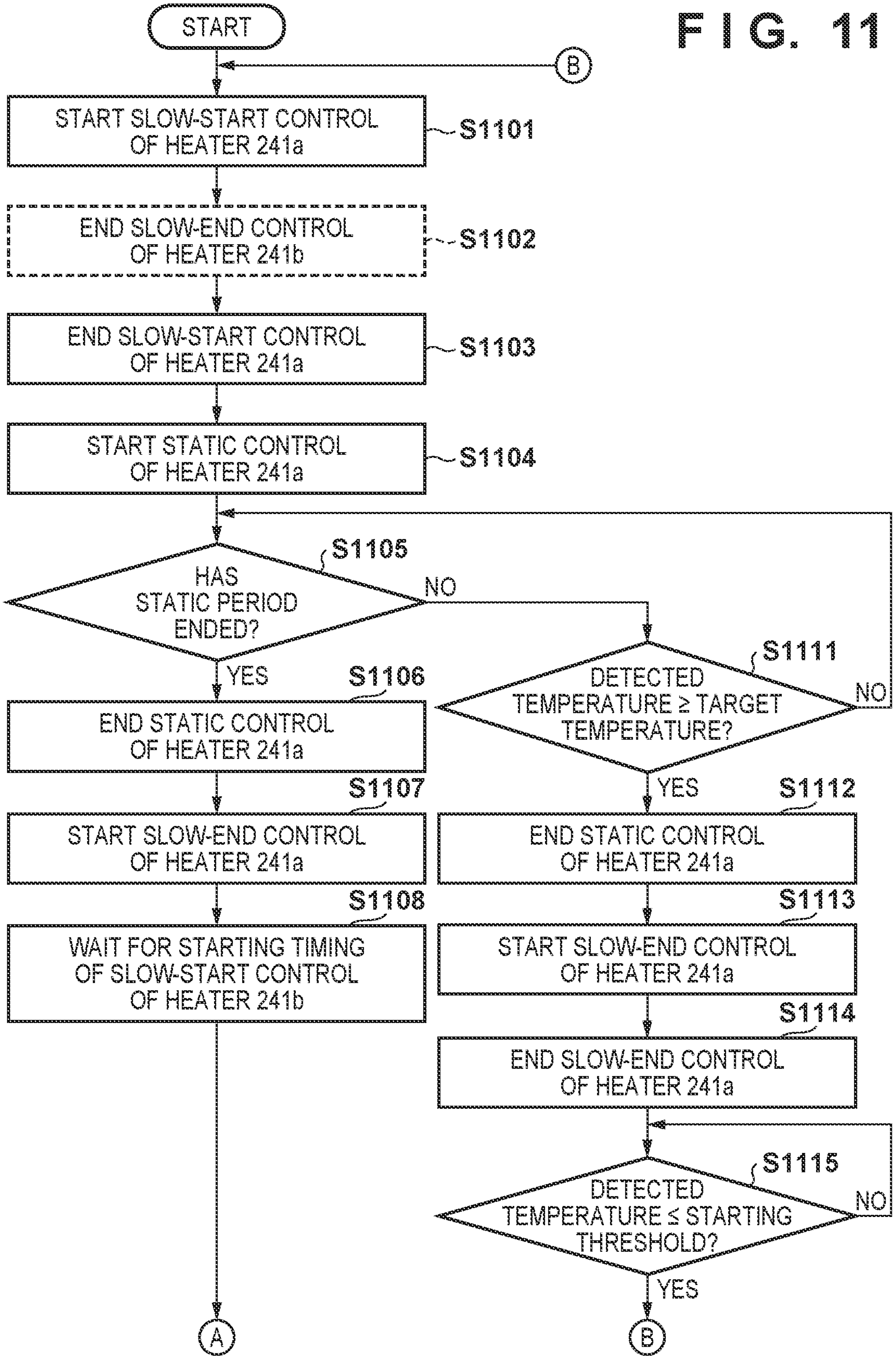
FIG. 11 is a flowchart illustrating a heater control method.
Figure 12:
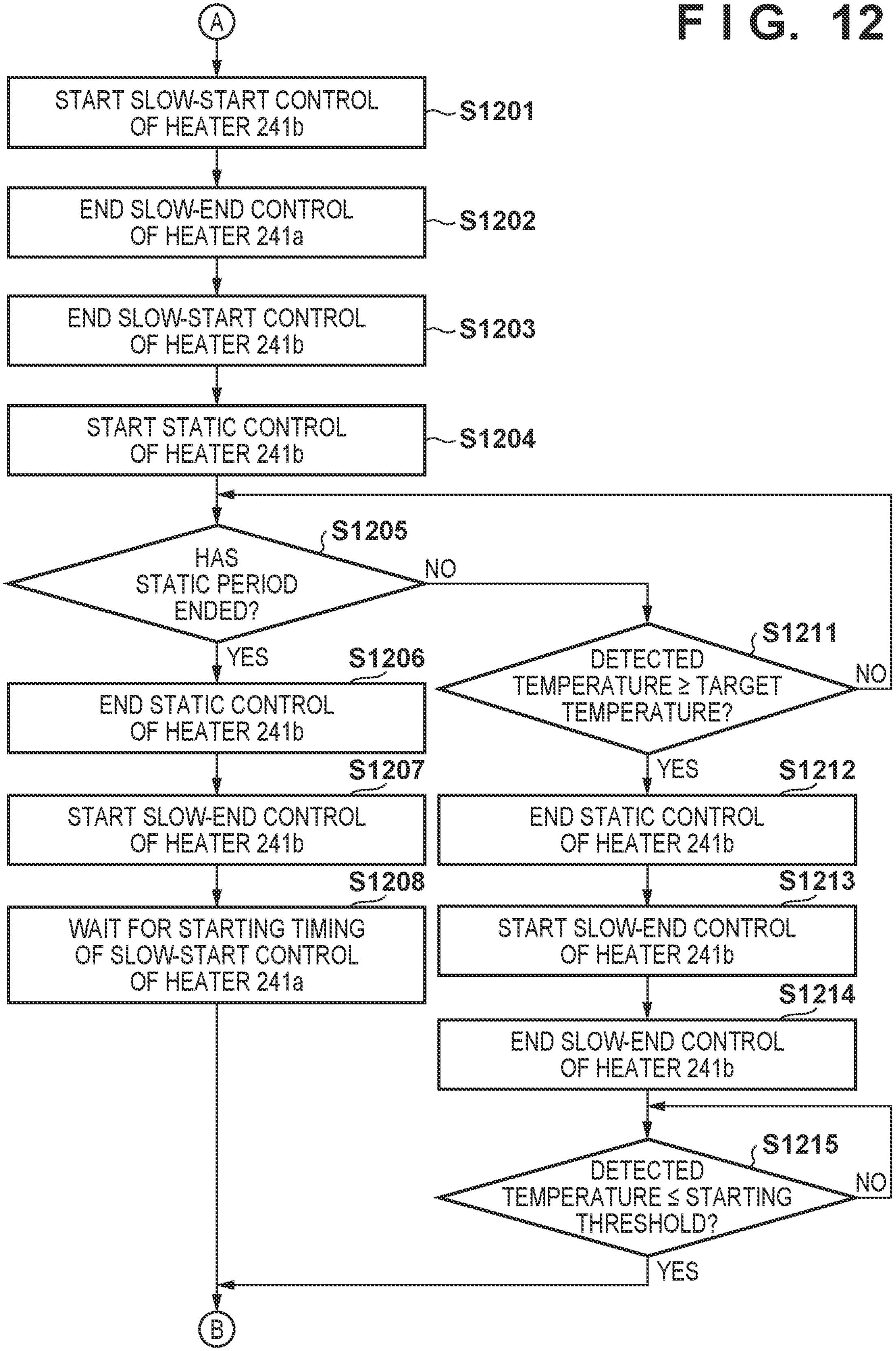
FIG. 12 is a flowchart illustrating a heater control method.

Heater control executed by the CPU 307 will be described with reference to FIGS. 11 and 12. When power is supplied from the AC power source 301 and the image forming apparatus 100 starts up, the CPU 307 executes the following processes according to the control program stored in the memory 309.

In step S1101, the CPU 307 (the energization control unit 1004) starts slow-start control of the heater 241*a*. The energization control unit 1004 gradually increases the duty cycle in half cycles of AC at the rate of change set by the setting unit 1000. A zero-cross detection circuit may be connected to the CPU 307 to identify the half cycle of the AC supplied from the AC power source 301.

Step S1102 is a step executed when slow-end control of the heater 241*b* is already being executed. If slow-end control of the heater 241*b* is not being executed, step S1102 is skipped.

In step S1102, the CPU 307 (the energization control unit 1004) ends slow-end control of the heater 241*b*. For example, the CPU 307 (the period determination unit 1003) determines whether the execution period of slow-end control has reached a predetermined period. When the execution period of slow-end control measured by the timer 1002 reaches the predetermined period set by the setting unit 1000, the energization control unit 1004 ends slow-end control of the heater 241*b*.

In step S1103, the CPU 307 (the energization control unit 1004) ends slow-start control of the heater 241*a*. For example, the CPU 307 (the period determination unit 1003) determines whether the execution period of slow-start control has reached a predetermined period. When the execution period of slow-start control measured by the timer 1002 reaches the predetermined period set by the setting unit 1000, the energization control unit 1004 ends slow-start control of the heater 241*a*.

In step S1104, the CPU 307 (the energization control unit 1004) starts static control of the heater 241*a*. For example, the energization control unit 1004 outputs a control signal to the switch 304*a* such that power is supplied to the heater 241*a* at the constant duty cycle set by the setting unit 1000.

In step S1105, the CPU 307 (the period determination unit 1003) determines whether the static period has ended based on a timer value obtained from the timer 1002. For example, the period determination unit 1003 determines whether the timer value has reached the static period set by the setting unit 1000. If the timer value has not reached the static period, the CPU 307 moves the sequence to step S1111.

In step S111, the CPU 307 (the temperature determination unit 1001) determines whether the detected temperature has become greater than or equal to the target temperature Th1. If the detected temperature is not greater than or equal to the target temperature th1, the CPU 307 moves the sequence to step S1105. If the detected temperature is greater than or equal to the target temperature th1, the CPU 307 moves the sequence to step S1112. In other words, if the temperature of the heating roller 240 reaches the target temperature th1 during the static period of the heater 241*a*, the CPU 307 moves the sequence to step S1112. This also corresponds to a case where the static period does not reach a predetermined maximum value (a limit time). In this manner, the slow-start period and the slow-end period are both constant periods, whereas the static period may be shorter.

In step S1112, the CPU 307 (the energization control unit 1004) ends static control of the heater 241*a*.

In step S1113, the CPU 307 (the energization control unit 1004) starts slow-end control of the heater 241*a*.

In step S1114, the CPU 307 (the energization control unit 1004) ends slow-end control of the heater 241*a*. For example, the CPU 307 (the period determination unit 1003) determines whether the execution period of slow-end control has reached a predetermined period. When the execution period of slow-end control measured by the timer 1002 reaches the predetermined period set by the setting unit 1000, the energization control unit 1004 ends slow-end control of the heater 241*a*.

In step S115, the CPU 307 (the temperature determination unit 1001) determines whether the detected temperature has become less than or equal to the starting threshold th0. If the detected temperature is less than or equal to the starting threshold th0, the CPU 307 moves the sequence to step S1101 again.

On the other hand, the timer value may reach the maximum value for the static period in step S1105, before the detected temperature obtained by the temperature sensor 306 reaches the target temperature th1. In this case, the CPU 307 moves the sequence from step S1105 to step S1106.

In step S1106, the CPU 307 (the energization control unit 1004) ends static control of the heater 241*a*.

In step S1107, the CPU 307 (the energization control unit 1004) starts slow-end control of the heater 241*a*.

In step S1108, the CPU 307 (the period determination unit 1003) waits for the starting timing of slow-start control of the heater 241*b* based on the timer value obtained from the timer 1002. The starting timing corresponds to time t3 indicated in FIG. 8A. The period from time t2 to time t3 is the predetermined period (standby time or delay time). The period determination unit 1003 measures the elapsed time from time t2, which is the starting timing of slow-end control of the heater 241*a*, using the timer 1002. When the elapsed time reaches the predetermined period, i.e., when time t3 arrives, the CPU 307 moves the sequence to step S1201.

In step S1201, the CPU 307 (the energization control unit 1004) starts slow-start control of the heater 241*b*. In other words, slow-start control of the heater 241*b* is started before slow-end control of the heater 241*a* ends. This causes the slow-end period of the heater 241*a* and the slow-start period of the heater 241*b* to overlap, and flicker is reduced as a result. The energization control unit 1004 gradually increases the duty cycle of the heater 241*b* in half cycles of AC at the rate of change set by the setting unit 1000.

In step S1202, the CPU 307 (the energization control unit 1004) ends slow-end control of the heater 241*a*. For example, the CPU 307 (the period determination unit 1003) determines whether the execution period of slow-end control has reached a predetermined period. When the execution period of slow-end control measured by the timer 1002 reaches the predetermined period set by the setting unit 1000, the energization control unit 1004 ends slow-end control of the heater 241*a*.

In step S1203, the CPU 307 (the energization control unit 1004) ends slow-start control of the heater 241*b*. For example, the CPU 307 (the period determination unit 1003) determines whether the execution period of slow-start control has reached a predetermined period. When the execution period of slow-start control measured by the timer 1002 reaches the predetermined period set by the setting unit 1000, the energization control unit 1004 ends slow-start control of the heater 241*b*.

In step S1204, the CPU 307 (the energization control unit 1004) starts static control of the heater 241*b*. The energization control unit 1004 outputs a control signal to the switch 304*b* such that power is supplied to the heater 241*b* at the constant duty cycle set by the setting unit 1000.

In step S1205, the CPU 307 (the period determination unit 1003) determines whether the static period has ended based on a timer value obtained from the timer 1002. The period determination unit 1003 determines whether the timer value has reached the maximum value of the static period set by the setting unit 1000. If the timer value has not reached the maximum value of the static period, the CPU 307 moves the sequence to step S1211.

In step S1211, the CPU 307 (the temperature determination unit 1001) determines whether the detected temperature has become greater than or equal to the target temperature Th1. If the detected temperature is not greater than or equal to the target temperature th1, the CPU 307 moves the sequence to step S1205. If the detected temperature is greater than or equal to the target temperature th1, the CPU 307 moves the sequence to step S1212. In other words, if the temperature of the heating roller 240 reaches the target temperature th1 during the static period of the heater 241*b*, the CPU 307 moves the sequence to step S1212.

In step S1212, the CPU 307 (the energization control unit 1004) ends static control of the heater 241*b*.

In step S1213, the CPU 307 (the energization control unit 1004) starts slow-end control of the heater 241*b*.

In step S1214, the CPU 307 (the energization control unit 1004) ends slow-end control of the heater 241*b*. For example, the CPU 307 (the period determination unit 1003) determines whether the execution period of slow-end control has reached a predetermined period. When the execution period of slow-end control measured by the timer 1002 reaches the predetermined period set by the setting unit 1000, the energization control unit 1004 ends slow-end control of the heater 241*b*. As a result, the heaters 241*a* and 241*b* stop, and the temperature of the heating roller 240 decreases.

In step S1215, the CPU 307 (the temperature determination unit 1001) determines whether the detected temperature has become less than or equal to the starting threshold th0. If the detected temperature is less than or equal to the starting threshold th0, the CPU 307 moves the sequence to step S1101 again.

On the other hand, the timer value may reach the static period in step S1205, before the detected temperature obtained by the temperature sensor 306 reaches the target temperature th1. In this case, the CPU 307 moves the sequence from step S1205 to step S1206.

In step S1206, the CPU 307 (the energization control unit 1004) ends static control of the heater 241*b*.

In step S1207, the CPU 307 (the energization control unit 1004) starts slow-end control of the heater 241*b*.

In step S1208, the CPU 307 (the period determination unit 1003) waits for the starting timing of slow-start control of the heater 241*a* based on the timer value obtained from the timer 1002. This starting timing is similar to the starting timing of slow-start control of the heater 241*b*. In other words, the starting timing is a timing at which slow-start control of the heater 241*b* is started before slow-end control of the heater 241*b* ends. This causes the slow-end period of the heater 241*b* and the slow-start period of the heater 241*a* to overlap. In other words, flicker is reduced. The period determination unit 1003 measures the elapsed time from the starting timing of slow-end control of the heater 241*b* using the timer 1002. When the elapsed time reaches the predetermined period, the CPU 307 moves the sequence to step S1101.

In this manner, the CPU 307 causes part of the slow-end period of one heater and part of the slow-start period of the other heater to overlap. This makes it possible to reduce changes in the input current of the heaters 241*a* and 241*b*, which in turn makes it possible to reduce variations in the supply voltage (AC voltage) of the AC power source 301. In other words, flicker is reduced.

Figure 13:
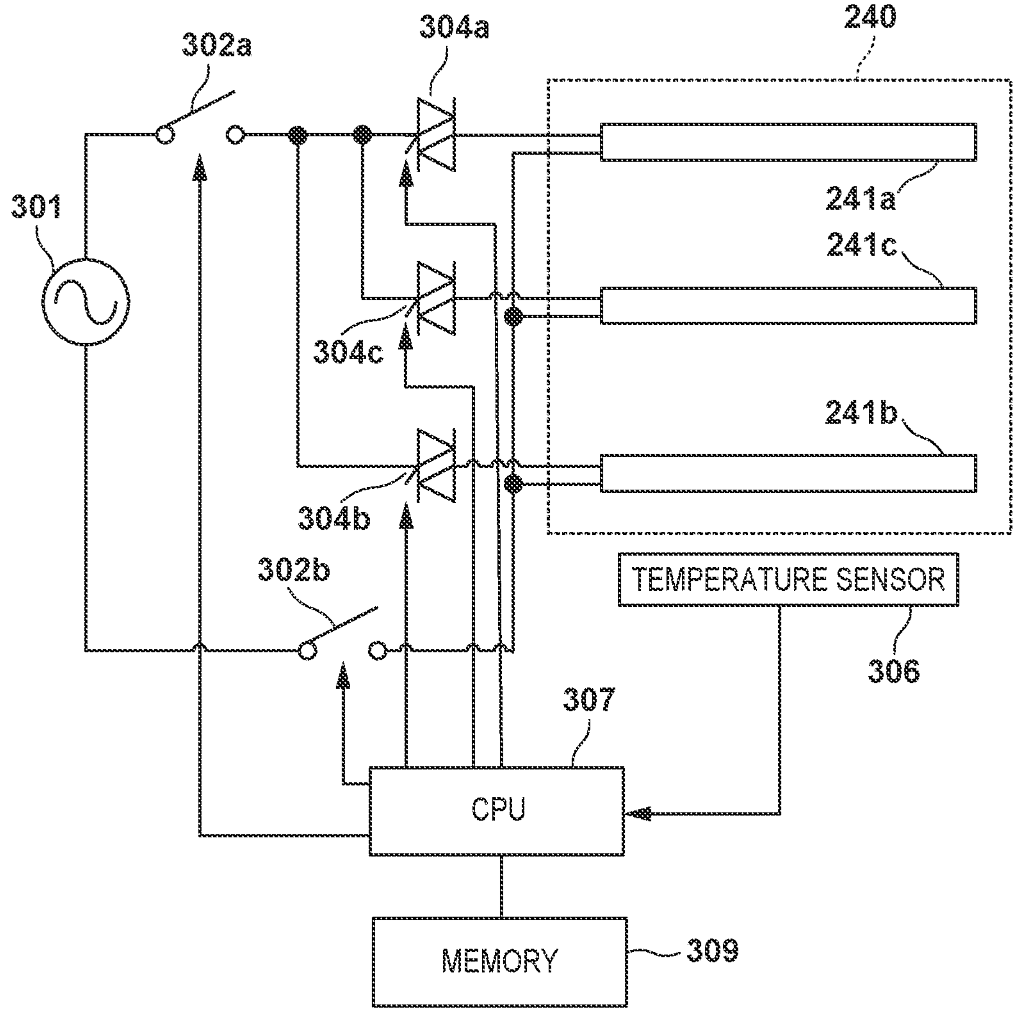
FIG. 13 is a diagram illustrating a controller that controls three heaters.

Thus far, a case where the two heaters 241*a* and 241*b* are connected to one power system (the AC power source 301) has been described. However, the foregoing embodiment can also be applied in cases where three or more heaters are connected to a single power system (the AC power source 301). For example, as illustrated in FIG. 13, a heater 241*c* that is powered from the AC power source 301 via a switch 304*c* controlled by the CPU 307 may be present. In this case, the CPU 307 may operate the three heaters 241*a*, 241*b*, and 241*c* one by one in sequence. For example, the slow-end period of the heater 241*a*, which operates first, and the slow-start period of the heater 241*b*, which operates next, partially overlap. Furthermore, the slow-end period of the heater 241*b* and the slow-start period of the heater 241*c* partially overlap. Furthermore, the slow-end period of the heater 241*c* and the slow-start period of the heater 241*a* partially overlap. Alternatively, the heater 241*a* and the heater 241*c* may be turned on/off simultaneously. In this case, the slow-end periods of the heater 241*a* and the heater 241*c*, and the slow-start period of the heater 241*b*, partially overlap. The slow-end period of the heater 241*b*, and the slow-start periods of the heater 241*a* and the heater 241*c*, partially overlap.

Technical Spirit Derived from Embodiments

Aspects 1 and 13

As illustrated in FIGS. 2, 3, and the like, the heaters 241*a* and 241*b* are an example of a plurality of heaters including a first heater and a second heater. The heating roller 240 and the fixing belt 210 are examples of a fixing unit that fixes a toner image to a sheet using heat supplied from at least one of the plurality of heaters. The CPU 307 is an example of a control unit that controls power supplied from a power source to the plurality of heaters. The slow-start period of the heater 241*a* is an example of a starting phase of an operating period of the first heater, in which the power supplied from the power source is gradually increased. The static period of the heater 241*a* is an example of a static phase in which the power supplied from the power source is controlled to a constant level. The slow-end period of the heater 241*a* is an example of an ending phase in which the power supplied from the power source is gradually reduced. The slow-start period of the heater 241*b* is an example of a starting phase of an operating period of the second heater, in which the power supplied from the power source is gradually increased. The static period of the heater 241*b* is an example of a static phase in which the power supplied from the power source is controlled to a constant level. The slow-end period of the heater 241*b* is an example of an ending phase in which the power supplied from the power source is gradually reduced. As illustrated in FIG. 8A and the like, the ending phase (the slow-end period) of the operating period of the first heater and the starting phase (the slow-start period) of the operating period of the second heater at least partially overlap. In other words, part of the slow-end period of one heater and part of the slow-start period of the other heater overlap. This reduces flicker more than in the past.

Aspect 2

The CPU 307 starts the operating period of the second heater before the operating period of the first heater ends. Through this, part of the ending phase of the operating period of the first heater and part of the starting phase of the operating period of the second heater may overlap. Basically, the slow-start period of the second heater begins during the slow-end period of the first heater. Furthermore, the slow-start period of the second heater may begin during the static period of the first heater.

Aspect 3

The temperature sensor 306 is an example of a detection unit that detects a temperature of the fixing unit (a temperature around the fixing unit). The temperature detected by the detection unit may not have reached a target temperature by a timing at which a predetermined period has passed from a timing at which the first heater started operating (Yes in step S1105). In this case, the CPU 307 may shift the first heater from the static phase to the ending phase. In such a case, it is necessary to assist the heater 241*b*.

Aspect 4

The temperature detected by the detection unit may have reached the target temperature by a timing at which a predetermined period has passed from a timing at which the second heater started operating (Yes in step S1211). In this case, the CPU 307 shifts the second heater from the static phase to the ending phase. In other words, when the target temperature is reached, the first heater and the second heater are each shut off through a slow-end period. Flicker is reduced as a result.

Aspect 5

The detected temperature may not have reached the target temperature by a timing at which a predetermined period has passed from the timing at which the second heater started operating (Yes in step S1205). In this case, the CPU 307 may be configured to shift the second heater from the static phase to the ending phase, and then shift the first heater back to the starting phase before the ending phase of the second heater ends.

Aspect 6

The plurality of heaters may further include a third heater (e.g., the heater 241*c*). An operating period of the third heater includes a starting phase in which the power supplied from the power source is gradually increased, a static phase in which the power supplied from the power source is controlled to a constant level, and an ending phase in which the power supplied from the power source is gradually reduced. The detected temperature may not have reached the target temperature by a timing at which a predetermined period has passed from the timing at which the second heater started operating. In this case, the CPU 307 may shift the second heater from the static phase to the ending phase, and then shift the third heater to the starting phase before the ending phase of the second heater ends. In this manner, even in a case where the three heaters are turned on one by one in sequence, this embodiment can reduce flicker.

Aspect 7

The detected temperature may not have reached the target temperature by a timing at which a predetermined period has passed from the timing at which the second heater started operating. In this case, the CPU 307 may shift the second heater from the static phase to the ending phase, and then shift the first heater and the third heater to their respective starting phases before the ending phase of the second heater ends. In this manner, flicker may be reduced by causing the starting phase of one heater group and the ending phase of another heater group to overlap.

Aspect 8

The CPU 307 may set an energization time (duty cycle) for supplying AC to the first heater and the second heater in units of half cycles of the AC supplied from the power source. The half cycle of the AC can be detected by a zero-cross detection circuit or the like. Accordingly, it is easier for the CPU 307 to accurately control the amount of power supplied to the heaters by employing the half cycle of AC as the unit of control.

Aspect 9

The resistance value of each of the plurality of heaters may increase as the temperature increases. In such heaters, the heater resistance value is also low when the heater temperature is low. In other words, inrush current tends to flow inrush current the heater, and thus flicker occurs easily. Accordingly, flicker may be reduced by applying this embodiment to heaters having such temperature-dependent characteristics.

Aspects 10 and 11

As illustrated in FIG. 9, the distribution of the heat generation capacity of the first heater in the direction in which the first heater extends may be different from the distribution of the heat generation capacity of the second heater in the direction in which the second heater extends. Generally, the sheet P is centered and transported so as to pass through the center of the transport path. Therefore, when the size of the sheet P is small, more heat is needed in the central region of the heating roller 240, and less heat is needed in both end regions of the heating roller 240. On the other hand, when the size of the sheet P is large, the entire area of the heating roller 240 is used to heat the sheet P. In other words, it is necessary to heat the entire area of the heating roller 240 uniformly. In this manner, by combining a plurality of heaters having different orientations, it is possible to support sheets P of various sizes. In particular, when the first heater and the second heater are operated in an alternating manner to heat the fixing unit uniformly in the direction in which the fixing unit extends, flicker is likely to occur. Accordingly, flicker is reduced by applying the above embodiment.

Aspect 12

The heater output of the first heater may be different from the heater output of the second heater. As illustrated in FIG. 9, the heater 241*a*, which heats the central region, is used more frequently than the heater 241*b*, which heats the end regions. In other words, the heater 241*a* is used as a main heater, and the heater 241*b* is used as an auxiliary heater. Therefore, the heater output of the heater 241*a* is greater than the heater output of the heater 241*b*.

Aspects 14 and 15

Each of the plurality of heaters may have a lamp that outputs light. Each of the plurality of heaters may be a halogen heater. In heaters that use lamps as heaters in this manner, the temperature is dependent on the resistance value. In other words, inrush current is likely to arise when the heater is started. Accordingly, flicker is reduced by applying this embodiment.

Aspect 16

As illustrated in FIG. 2, the fixing unit may include a cylindrical rotating body (e.g., the heating roller 240). The plurality of heaters may be provided inside the rotating body. This makes it possible to make effective use of limited space in the image forming apparatus 100. This also makes it possible to efficiently heat the rotating body.

Aspect A1

An image forming apparatus comprising:
- an image forming unit configured to form an image on a sheet;
- a fixing unit configured to fix the image to the sheet, the fixing unit including:
  - a first heater to which is supplied current for generating heat; and
  - a second heater to which is supplied current for generating heat:
- a temperature sensor configured to detect a temperature of the fixing unit; and
- a controller configured to:
  - control first current supplied to the first heater and second current supplied to the second heater such that the temperature detected by the temperature sensor maintains a target temperature;

in a case where the first current is supplied to the first heater, gradually increase the first current in a first period, supply the first current based on a first duty cycle in a second period that follows the first period, and gradually reduce the first current to stop supplying the first current in a third period that follows the second period;

in a case where the second current is supplied to the second heater, gradually increase the second current in a fourth period, supply the second current based on a second duty cycle in a fifth period that follows the fourth period, and gradually reduce the second current to stop supplying the second current in a sixth period that follows the fifth period; and control the supply of the second current such that part of the fourth period overlaps with the third period.

Aspect A2

The image forming apparatus according to Aspect A1, wherein the controller controls the supply of the first current such that part of the first period overlaps with the sixth period.

Aspect A3

The image forming apparatus according to Aspect A1, wherein the controller shifts the first heater from the second period to the third period when the temperature detected by the temperature sensor has not reached the target temperature by a timing at which a predetermined time has passed after a timing at which the first heater started operating.

Aspect A4

The image forming apparatus according to Aspect A3, wherein the controller shifts the second heater from the fifth period to the sixth period when the temperature detected by the temperature sensor has reached the target temperature by a timing at which a predetermined time has passed after a timing at which the second heater started operating.

Aspect A5

The image forming apparatus according to Aspect A4, wherein the controller shifts the second heater from the fifth period to the sixth period, and shifts the first heater to the first period again after the sixth period of the second heater ends, when the temperature detected by the temperature sensor has not reached the target temperature by a timing at which a predetermined time has passed after a timing at which the second heater started operating.

Aspect A6

The image forming apparatus according to Aspect A4, wherein the fixing unit further includes a third heater, and the controller is further configured to:

control third current supplied to the third heater such that the temperature detected by the temperature sensor maintains the target temperature;

when the third current is supplied to the third heater, gradually increase the third current in a seventh period, supply the third current based on a third duty cycle in an eighth period that follows the seventh period, and gradually reduce the third current to stop supplying the third current in a ninth period that follows the eighth period; and shift the second heater from the fifth period to the sixth period, and shift the third heater to the seventh period after the sixth period of the second heater ends, when the temperature detected by the temperature sensor has not reached the target temperature by a timing at which a predetermined time has passed after a timing at which the second heater started operating.

Aspect A7

The image forming apparatus according to Aspect A1, wherein the controller sets an energization time for supplying AC voltage to the first heater and the second heater in units of half cycles of the AC voltage supplied.

Aspect A8

The image forming apparatus according to Aspect A1, wherein a heat generation distribution characteristic of the first heater in a direction in which the first heater extends is different from a heat generation distribution characteristic of the second heater in a direction in which the second heater extends.

Aspect A9

The image forming apparatus according to Aspect A1, wherein the controller causes the first heater and the second heater to operate in an alternating manner.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-120811, filed Jul. 21, 2021 which is hereby incorporated by reference herein in its entirety.

What is claimed is:

1. An image forming apparatus comprising:

an image forming unit configured to form an image on a sheet;

a fixing unit configured to fix the image to the sheet, the fixing unit including:

a first heater to which is supplied current for generating heat; and a second heater to which is supplied current for generating heat;

a temperature sensor configured to detect a temperature of the fixing unit; and a controller configured to:

control a first current supplied to the first heater and a second current supplied to the second heater such that the temperature detected by the temperature sensor maintains a target temperature;

in a case where the first current is supplied to the first heater, gradually increase the first current in a first period, supply the first current based on a first duty cycle in a second period that follows the first period, and gradually reduce the first current to stop supplying the first current in a third period that follows the second period;

in a case where the second current is supplied to the second heater, gradually increase the second current in a fourth period, supply the second current based on a second duty cycle in a fifth period that follows the fourth period, and gradually reduce the second current to stop supplying the second current in a sixth period that follows the fifth period; and control the supply of the second current such that part of the fourth period overlaps with the third period, wherein the fourth period starts after a predetermined amount of time has passed from a timing at which the third period starts.

2. The image forming apparatus according to claim 1, wherein the controller controls the supply of the first current such that part of the first period overlaps with the sixth period.

3. The image forming apparatus according to claim 1, wherein the controller shifts the first heater from the second period to the third period when the temperature detected by the temperature sensor has not reached the target temperature by a timing at which a predetermined time has passed after a timing at which the first heater started operating.

4. The image forming apparatus according to claim 3, wherein the controller shifts the second heater from the fifth period to the sixth period when the temperature detected by the temperature sensor has reached the target temperature by a timing at which a predetermined time has passed after a timing at which the second heater started operating.

5. The image forming apparatus according to claim 4, wherein the controller shifts the second heater from the fifth period to the sixth period, and shifts the first heater to the first period again after the sixth period of the second heater ends, when the temperature detected by the temperature sensor has not reached the target temperature by a timing at which a predetermined time has passed after a timing at which the second heater started operating.

6. The image forming apparatus according to claim 1, wherein the controller sets an energization time for supplying the AC voltage to the first heater and the second heater in units of half cycles of the AC voltage supplied.

7. The image forming apparatus according to claim 1, wherein a heat generation distribution characteristic of the first heater in a direction in which the first heater extends is different from a heat generation distribution characteristic of the second heater in a direction in which the second heater extends.

8. The image forming apparatus according to claim 1, wherein the controller causes the first heater and the second heater to operate in an alternating manner.

9. The image forming apparatus according to claim 1, wherein the third period of the first heater ends during the fourth period of the second heater.

* * * * *